United States Patent
Olsen et al.

(10) Patent No.: US 6,931,057 B2
(45) Date of Patent: Aug. 16, 2005

(54) METHOD, ARTICLE OF MANUFACTURE AND SYSTEM TO DETERMINE A BIT RATE OF A SIGNAL

(75) Inventors: Ronald D. Olsen, Lake View, NY (US); Michael E. Rupp, Amherst, NY (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 09/826,652

(22) Filed: Apr. 5, 2001

(65) Prior Publication Data

US 2002/0146069 A1 Oct. 10, 2002

(51) Int. Cl.[7] .................................... H04Q 1/20
(52) U.S. Cl. ................. 375/225; 375/311; 375/377; 370/232; 370/234; 379/93.33
(58) Field of Search .................. 375/225, 377, 375/316, 368, 240.24, 354, 222, 239, 311; 340/7.2, 7.38; 709/233; 379/93.33; 710/41; 370/232, 234

(56) References Cited

U.S. PATENT DOCUMENTS

| | | | | |
|---|---|---|---|---|
| 5,631,925 A | * | 5/1997 | Koenzen | 375/225 |
| 5,982,837 A | * | 11/1999 | Earnest | 375/377 |
| 6,163,586 A | * | 12/2000 | Hongbin Hao et al. | 375/377 |
| 6,163,808 A | * | 12/2000 | Kilkki | 709/233 |
| 6,215,414 B1 | * | 4/2001 | Kuramatsu | 340/7.2 |

OTHER PUBLICATIONS

J. Christoph Scheytt, "a 0.155–. 0.622–, and 2.488–Gb/s Automatic Bit–Rate Selecting Clock and Data Recovery IC for Bit–Rate Transparent SDH System", IEEE Journal of Solid–state Circuits, vol. 34, No. 12. pp. 1935–1943, Dec. 1999.*

* cited by examiner

*Primary Examiner*—Shuwang Liu
*Assistant Examiner*—T Wang
(74) *Attorney, Agent, or Firm*—Alan Pedersen-Giles

(57) ABSTRACT

A method, article of manufacture and system to determine a bit rate of a signal is described.

30 Claims, 5 Drawing Sheets

METHOD, ARTICLE OF MANUFACTURE AND SYSTEM TO DETERMINE A BIT RATE OF A SIGNAL

BACKGROUND INFORMATION

This invention relates generally to determining the bit rate of a signal. Digital signals are formatted to have different bit rates. For example, in telephony equipment, digital signals may be 2.048 MHz, 4.096 MHZ or 8.092 MHz. In order for digital equipment to properly communicate via digital signals, the bit rate must be known. One existing method of determining the bit rate is to identify the piece of equipment to which a connection is desired, and then consult with the manufacturer of that equipment to obtain the bit rate at which that equipment operates. Accordingly, in contrast to the foregoing method, automatically detecting the bit rate of a signal would be highly desirable.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION

An embodiment of the invention analyzes a signal to automatically detect the bit rate of the signal. For example, a digital signal having logical events, for example logical ones and logical zeros, is received. A plurality of durations are determined, each duration corresponding to elapsed time between logical events of the signal, for example between a first logical one and a second logical one. A first counter is incremented for each occurrence of a first duration to provide a first total value. A second counter is incremented for each occurrence of a second duration to provide a second total value. The second duration may correspond to the selected duration plus a time interval. Then the bit rate of the signal is determined using a weighted average corresponding to the first and second values.

Figure 1A:
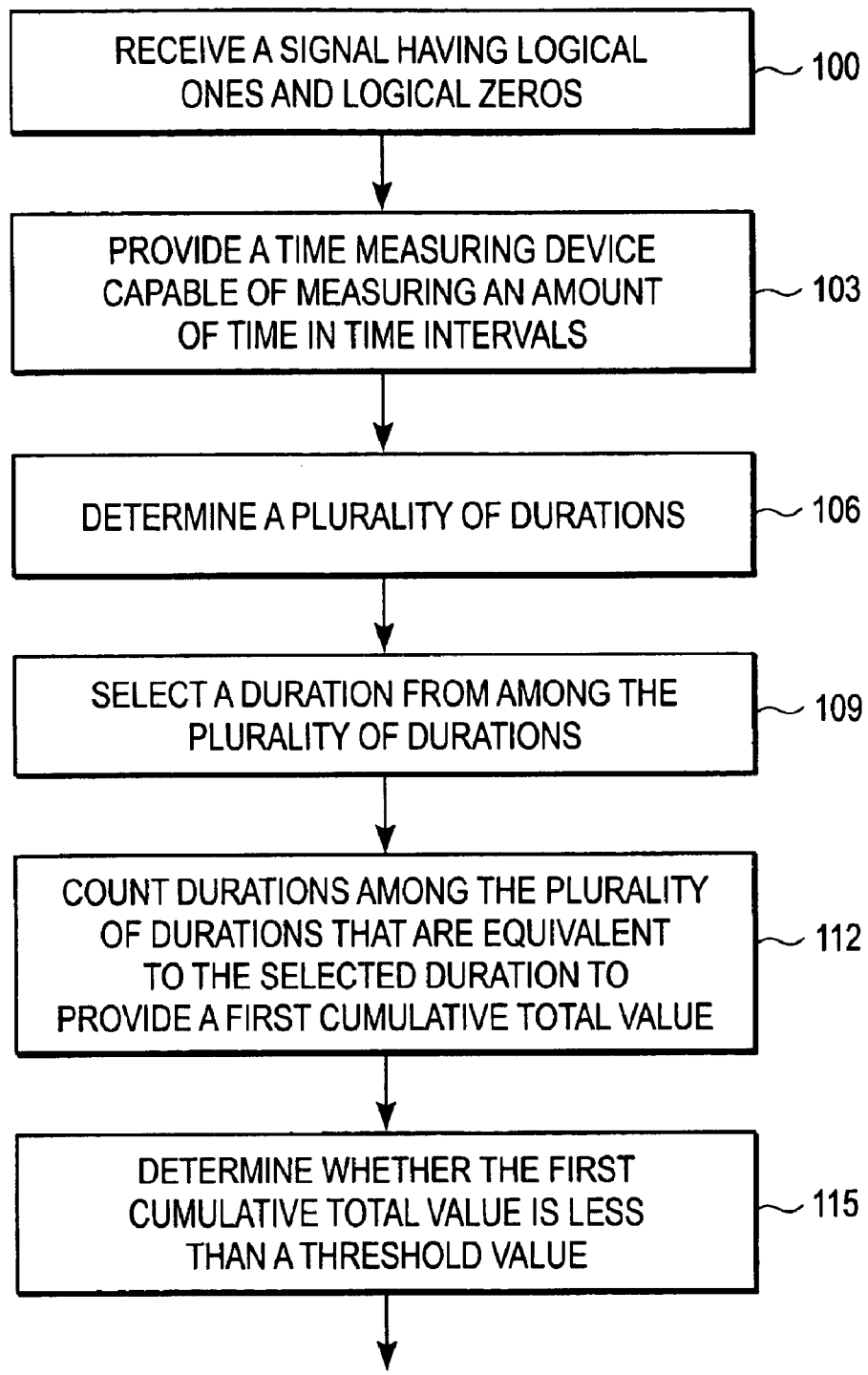
FIGS. 1A and 1B are a block flow diagram in accordance with one embodiment of the invention.
Figure 1B:
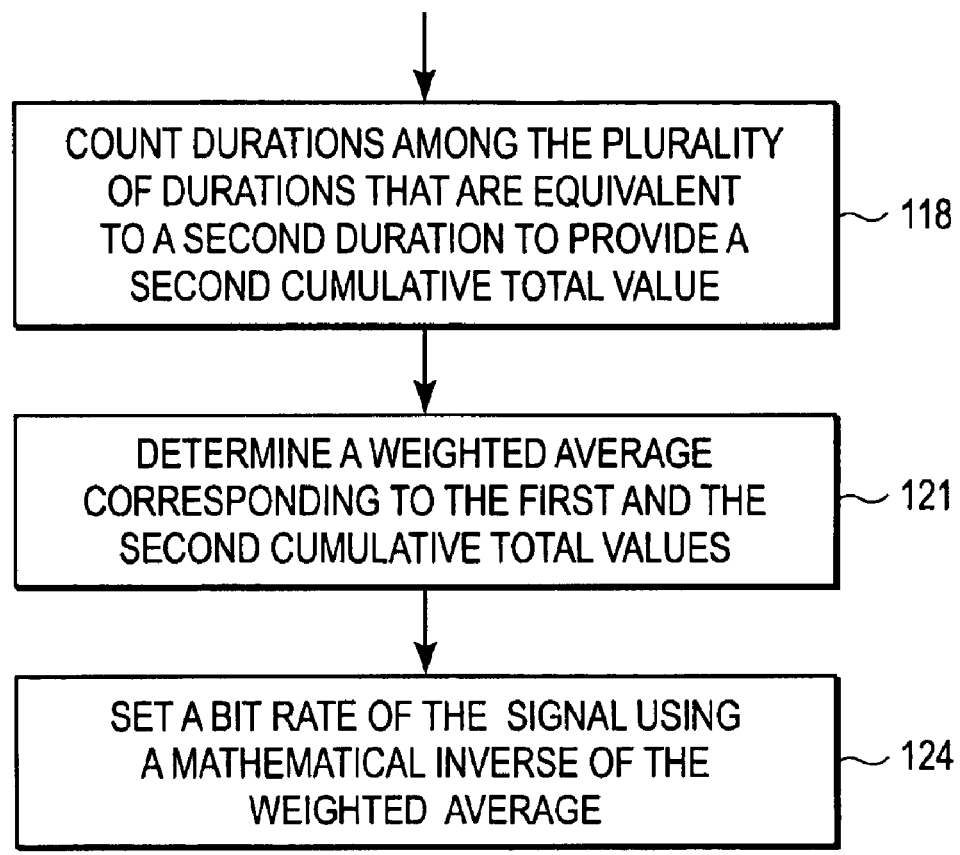

FIGS. 1A and 1B illustrate a method according to the invention. A signal of interest, having logical ones and logical zeros, may be received 100. A time measuring device, which may include the system clock of a computer, is provided 103. The time measuring device may be capable of counting a number of time intervals to provide an amount of time. For example, one time interval may be one output or oscillation of the system clock, and the amount of time may be the cumulative total number of outputs or oscillations of the system clock detected from occurrence of a first action or event to the occurrence of a second action or event.

A plurality of durations may be determined 106 using the time measuring device. Each duration may correspond to an amount of time elapsed between events, such as detection of a first logical one and detection of a second logical one. For example, a duration may be determined by starting the time measuring device upon detecting a transition from a logical zero to a logical one in the signal. The time measuring device counts the system clock oscillations until the time measuring device is instructed to stop counting. The time measuring device may be instructed to stop counting when a subsequent transition from a logical zero to a logical one in the signal is detected.

Detection of logical events may be performed by sensing a change in the signal's voltage from a reference voltage to a voltage indicative of a logical one. The change from a reference voltage to a voltage indicative of a logical one is referred to herein as the "leading edge of a pulse" or the "leading edge of a logical one". The leading edge of a logical one may be thought of as the end of a logical zero.

Other methods of detecting logical events may be employed. For example, by sensing a change in the signal's voltage from a voltage indicative of a logical one to a reference voltage, a so called "trailing edge of a pulse" or "trailing edge of a logical one" may be detected. With this in mind, an embodiment of the invention is described herein where the leading edge of a pulse is detected, but the invention is not limited to this embodiment.

After a plurality of durations have been determined, one of the plurality of durations is selected 109. In one embodiment of the invention, the selected duration is the shortest of the plurality of durations. For example, if a duration of 16 system clock oscillations is determined 100 times, and a duration of 17 system clock oscillations is determined 500 times, and a duration of 25 system clock oscillations is determined 5 times, the selected duration is 16 system clocks.

A first total value may be determined by counting durations 112 among the plurality of durations that are approximately equivalent to the selected duration. The first total value is the number of times the selected duration is among the plurality of durations. Using the example above, the first total value would be 100.

Since it is likely the time measuring device is not synchronized with the signal, the selected duration may not accurately correspond to the bit rate of the signal. Therefore, information corresponding to a second duration, and possibly a third duration (or more) may be selected for further analysis. If so, a second total value is determined by counting durations 118 among the plurality of durations that correspond to the second duration. The second total value corresponds to the number of times the second duration is found in the plurality of durations. The second duration may be approximately equivalent to the selected duration plus one time interval. For example, if the selected duration is 16 system clock oscillations, then the second duration is 17 system clock oscillations. In the example given above, the duration of 17 system clock oscillations was detected 500 times, and so the second total value would be 500.

A third total value may be determined, if needed, by counting durations among the plurality of durations that correspond to the third duration. The third total value corresponds to the number of times the third duration is found in the plurality of durations. The third duration may be approximately equivalent to the selected duration plus two time intervals. Therefore, in the example given above, the third duration would be 18 system clock oscillations, and since no duration among the plurality of durations was 18 system clock oscillations in length, the third total value is zero.

The total values may each be determined by setting a counter to zero, evaluating each duration of the plurality of durations, and incrementing the counter for each duration that corresponds to the selected duration, second duration or third duration, as the case may be.

If more durations than the selected duration are determined, a weighted average is determined 121. The weighted average may be calculated by multiplying the selected and the determined durations by their corresponding total value to provide a product corresponding to each duration. Then these products are summed to provide a sum of products, and a sum of the corresponding total values is determined. Then the weighted average is determined by dividing the sum of products by the sum of the total values. In the example described above, the first product is 16×100= 1,600, the second product is 17×500=8,500 and the third product is 18×0=0. The sum of the products is 1,600+8, 500+0=10,100. The sum of the total values is 100+500+0= 600, and the weighted average is 10,100÷600=16.833.

Next, the bit rate of the signal may be set 124 using the mathematical inverse of the selected duration, or the mathematical inverse of the weighted average, if the weighted average was determined. If the signal is known to represent immediately consecutive logical ones with a change in the signal, but represents immediately consecutive logical zeros without a change in the signal, such as in an alternate mark inversion ("AMI") signal, then the bit rate is set to the mathematical inverse of the weighted average. However, if the signal is known to represent immediately consecutive logical ones without a change in the signal, such as in a unipolar NRZ ("non-return to zero") signal or a bipolar NRZ signal, then the bit rate is set to the mathematical inverse of one-half of the weighted average. Using the example given above, if the signal is known to be an AMI signal, the bit rate would be set to 1÷16.833=0.0594 bits per system clock oscillation. However, if the signal is known to be a unipolar NRZ signal, then the bit rate would be set to 1÷(16.833÷2)= 0.1188 bits per system clock oscillation.

If the time interval of the time measuring device is known, for example the oscillation rate of the system clock is 16 MHz, then the bit rate may be converted into another time measurement system, for example bits per second. If the oscillation rate of the time measuring device is 16 million oscillations per second, then a bit rate of 0.1188 bits per system clock oscillation would be set to 1,900,990.1 bits per second.

In some situations, the shortest duration is not the duration that should be selected. For example, noise in the signal may provide a number of durations that are shorter than the shortest determined duration corresponding to the signal. Therefore, it may be necessary to eliminate those determined durations that are not likely to correspond to the signal. One method of doing so involves setting a threshold value and comparing the first total value to the threshold value. If the first total value is less than the threshold value, the next shortest duration may be selected from among the plurality of durations, and the method proceeds as described above to determine a first total value corresponding to the selected duration, however now the selected duration is not the shortest duration, but is instead the next shortest duration among the plurality of durations. This process of comparing the first total value to the threshold, and selecting the next shortest duration if the selected duration is less than the threshold, continues until the selected duration has a corresponding total value that is not less than the threshold.

The threshold may be a preselected number or the threshold may be set depending on the number of durations determined. For example, the threshold may be some percentage, for example 2%, of the total number of durations determined.

Figure 2A:
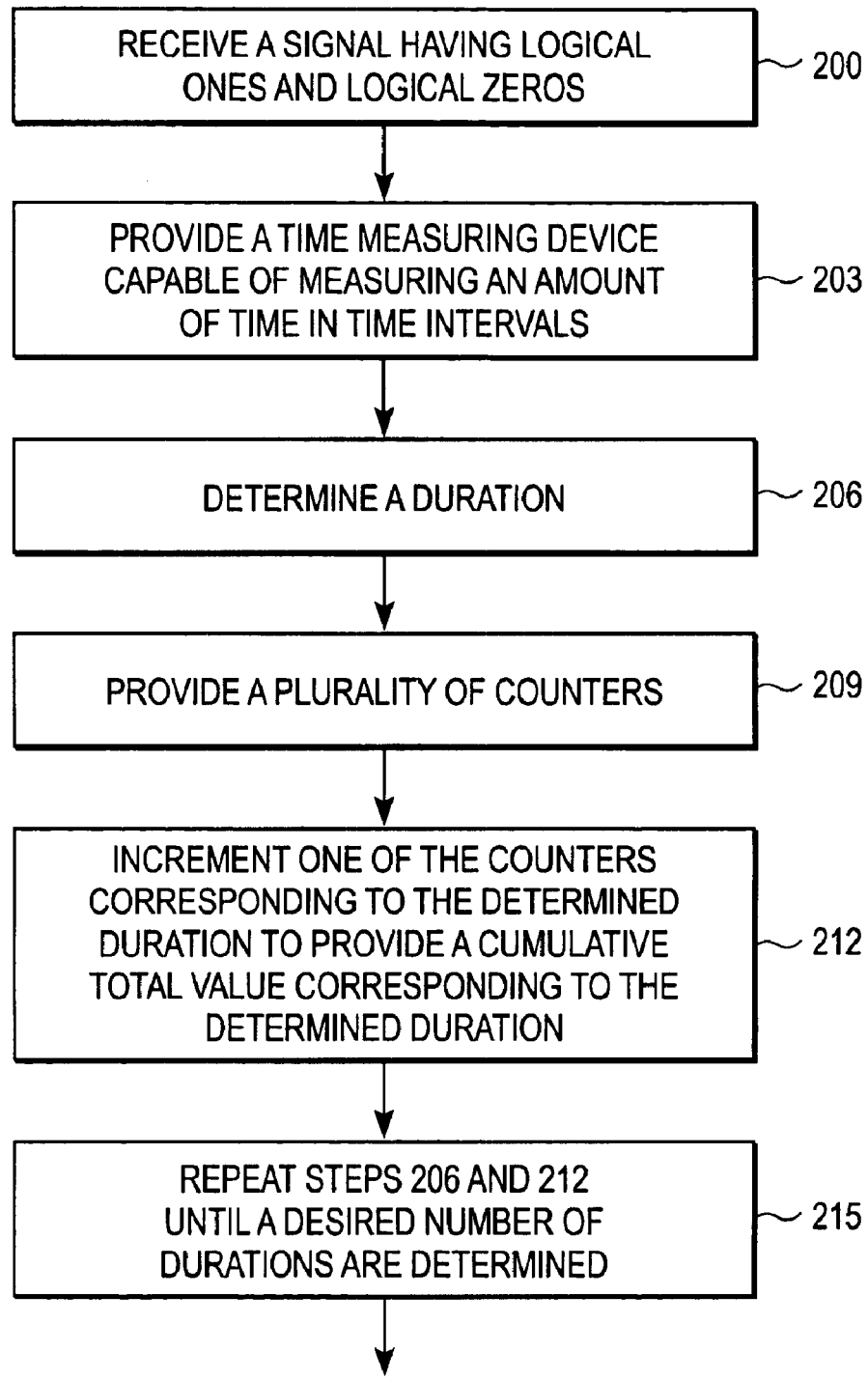
FIGS. 2A and 2B are a block flow diagram in accordance with one embodiment of the invention.
Figure 2B:
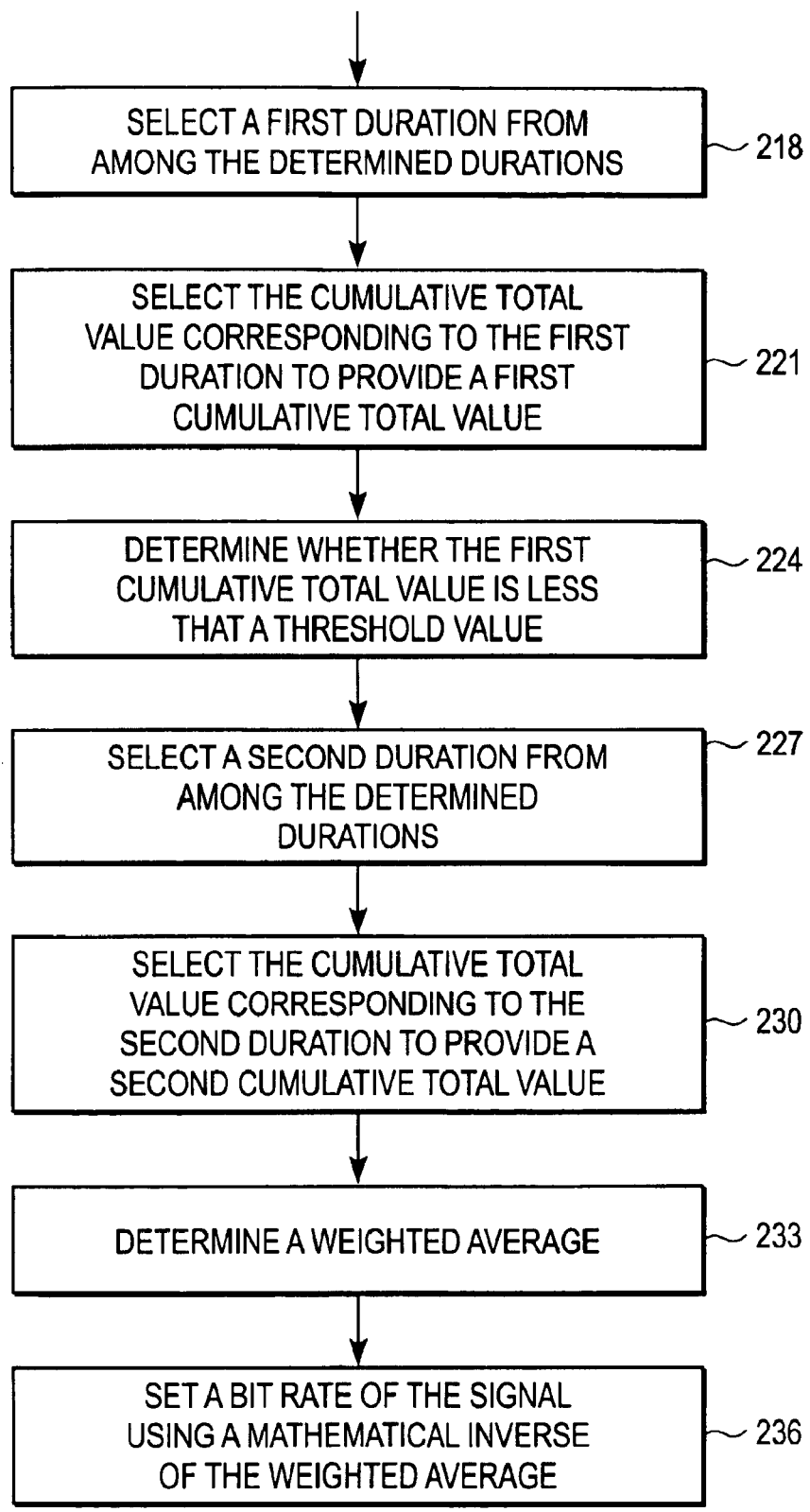

In another embodiment of the invention, illustrated in FIGS. 2A and 2B, a signal having logical ones and logical zeros is received 200, and a time measuring device that is capable of measuring an amount of time in time intervals may be provided 203. Then the time measuring device may be used to determine 206 a duration corresponding to the signal. As before, the duration may correspond to an elapsed time between detection of an initial logical one and detection of a subsequent logical one. A plurality of counters may be provided 209. The counters may initially be set to zero, and the counters may correspond to expected durations of time. One of the counters corresponding to the determined duration is incremented 212 to provide a total value corresponding to the determined duration. The process of determining a duration 206 corresponding to the signal, and then incrementing a counter 212 corresponding to the determined duration, may be repeated 215 until a desired number of durations have been determined and counted.

Then a first duration may be selected 218 from among the determined durations. The first duration may be the shortest of the durations determined and counted. The total value from the counter corresponding to the first duration is selected 221. As described above, a second duration that is one time interval greater than the first duration may be selected 227, and the total value provided by the counter corresponding to the second duration is selected 230 as a second total value. As described above, a third duration, which corresponds to the first duration plus two time intervals, may also be selected, and a third total value corresponding to the third duration is selected.

Once the durations and corresponding total values are selected, the weighted average may be determined 233. The weighted average may be computed as described above. Then, a bit rate may be set 236 using the mathematical inverse of the weighted average, as described above.

As in the previously described embodiment, the time measuring device may include an oscillator having a known oscillation rate. Furthermore, determining a duration may include counting the number of oscillations between detection of the initial logical one and detection of the subsequent logical one, as described above. Also, as described above, the first total value may be compared to a threshold value in order to determine 224 whether a new first duration should be selected.

One embodiment of the invention may include a check of the determined bit rate. For example, if the signal is known to be an alternate mark inversion ("AMI") signal, the weighted average will correspond to the duration measured when the second logical one immediately follows the first logical one. The AMI signal will probably provide a logical one, immediately followed by a logical zero and then a logical one. Therefore, the duration determined when a first logical one is followed immediately by a logical zero and then immediately by a logical one may be twice that determined when two logical ones are received without the intervening logical zero. Consequently, to check that the proper bit rate for the AMI signal has been determined, it may be determined whether the durations corresponding to half of the determined bit rate have corresponding total values that are more than zero, or above a threshold value, as the case may be. A similar check may be made for other types of signals, such as the unipolar NRZ signal and the bipolar NRZ signal discussed above. In these NRZ signals, if the bit rate is properly determined, the durations corresponding to one-third of the determined bit rate should have corresponding total values that are more than zero, or above the threshold value, as the case may be.

It may be appreciated that the ability to accurately determine the bit rate of the signal may be diminished when the time intervals of the time measuring device are large relative to the signal bit rate. On the other hand, when the time intervals of the time measuring device are small relative to the signal bit rate, the ability to accurately determine the signal bit rate is increased. It is therefore possible that, given a time measuring device with sufficiently small time intervals (e.g. a high oscillation rate), three durations and three corresponding total values need not be selected in order to provide a sufficiently accurate bit rate. For example, if the time intervals of the time measuring device are sufficiently small, the bit rate could be accurately determined using two durations and two corresponding total values. However, if the time intervals of the time measuring device are large relative to the bit rate, then more than three durations and three corresponding total values may be needed to accurately determine the bit rate.

Figure 3:
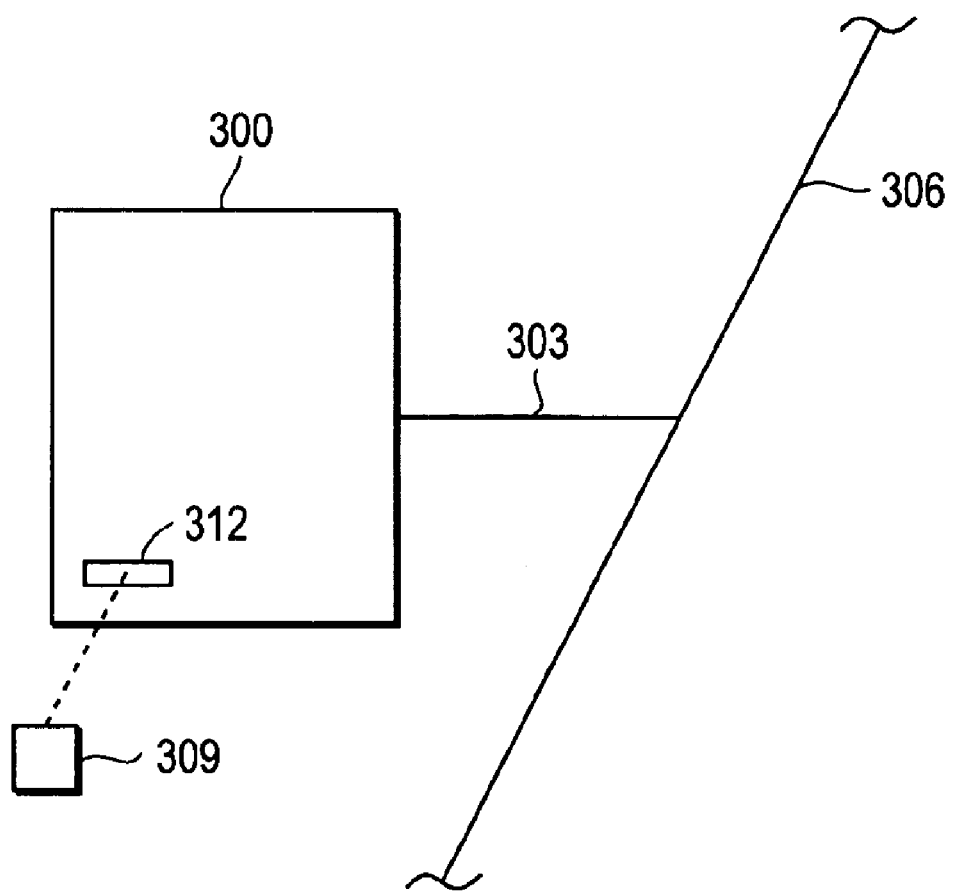
FIG. 3 illustrates a system and an article of manufacture according to an embodiment of the invention.

An embodiment of the invention may be implemented by a system 300 illustrated in FIG. 3. The system 300 includes a computer 301 having computer software running thereon. A system clock of the computer 301 may be used as a time measuring device. The time measuring device assists the computer 301 in determining each duration by identifying intervals of time to the computer. The computer 301 may be connected via a connection line 303 to a transmission line 306 carrying the signal for which a bit rate must be determined. The computer software may be stored on an article of manufacture 309, such as a computer readable storage medium, for example a compact-disc, and loaded onto the computer 301, for example via a compact-disc drive 312. In such a system, the computer 301 may not be able to capture data on each duration, but over time, the computer 301 should be able to gather a representative sample of information on the durations provided by the signal.

The computer software has computer readable program code instructions to cause a computer 301 to determine a bit rate of a signal. Portions of the instructions may be thought of as computer readable program code modules to cause the computer 301 to carry out the methods described above. One such code module that may be provided is capable of causing the computer 301 to determine a plurality of durations, each duration corresponding to an elapsed time between detection of a first logical one and detection of a second logical one of a signal. This code module may include instructions that cause the computer to count time intervals occurring between detection of the first logical one and detection of the second logical one.

The instructions may also include a code module capable of causing the computer 301 to select a duration from among the plurality of durations. The selected duration may be the shortest of the plurality of durations. In addition, a code module may be provided that is capable of causing the computer 301 to count those durations that are approximately equivalent to the selected duration to provide a first total value, and causing the computer 301 to count those durations that are approximately equivalent to a second duration to provide a second total value, the second duration corresponding to the selected duration plus one time interval.

In addition, the instructions may include a code module to cause the computer 301 to determine a weighted average corresponding to the first and the second total values, and to the selected duration and the second duration. The instructions may also include a code module that is capable of causing the computer 301 to set a bit rate of the signal using a mathematical inverse of the weighted average.

A code module may be capable of causing the computer 301 to determine whether the first total value is less than a threshold value. If the first total value is less than the threshold value, the code module causes the computer 301 to select another duration from among the plurality of durations, and that duration may be the next shortest of the plurality of durations.

The code module for causing the computer 301 to count durations and provide the first total value may include instructions that cause the computer 301 to set a counter to zero prior to evaluating the durations, and instructions that cause the computer 301 to evaluate each duration of the plurality of durations to determine whether each duration is approximately equivalent to the selected duration. Furthermore, a code module may be provided that is capable of causing the computer 301 to increment the counter for each duration that corresponds to the selected duration.

The code module for causing the computer 301 to determine the weighted average may have a instructions to cause the computer 301 to multiply the selected duration by the first total value to provide a first product, and to cause the computer 301 to multiply the second duration by the second total value to provide a second product. A code module may also be capable of causing the computer 301 to add the first product and the second product to provide a sum of the products. In addition, a code module may be capable of causing the computer 301 to add the first total value to the second total value to provide a sum of the total values, and for causing the computer 301 to divide the sum of the products by the sum of the total values to determine the weighted average.

Once the bit rate of the signal is known, devices may be programed to receive and interpret the signal. Although the invention has been described with respect to one or more particular embodiments, it will be understood that other embodiments of the invention may be made without departing from the spirit and scope of the invention.

What is claimed is:

1. A signal bit rate determination method, comprising:
   determining durations, each duration corresponding to time elapsed between detection of a first logical event of a signal and a second logical event of the signal;
   selecting a first duration from the durations, and incrementing a first counter for each occurrence of the first duration to provide a first total value;
   incrementing a second counter for each occurrence of a second duration to provide a second total value, the second duration corresponding to the selected first duration plus a time interval;
   determining a bit rate of the signal using a weighted average corresponding to the first and the second total values.

2. The method of claim 1, wherein determining one of the durations includes counting time intervals between detection of the first logical event and detection of the second logical event.

3. The method of claim 1, wherein the first logical event is detected by sensing a leading edge of a pulse corresponding to the signal.

4. The method of claim 1, wherein the second logical event is detected by sensing a leading edge of a pulse corresponding to the signal.

5. The method of claim 1, wherein the first duration is the shortest duration among the plurality of durations.

6. The method of claim 1, wherein the bit rate is a mathematical inverse of one-half of the weighted average.

7. The method of claim 1, wherein the bit rate is a mathematical inverse of the weighted average.

8. A signal bit rate determination method, comprising:
- determining a plurality of durations, each duration corresponding to time elapsed between detection of a first logical event of a signal and detection of a second logical event of the signal;
- selecting a first duration from among the plurality of durations;
- counting durations among the plurality of durations corresponding to the selected first duration to provide a first total value;
- counting durations among the plurality of durations corresponding to a second duration to provide a second total value, the second duration corresponding to the first duration plus a time interval;
- determining a weighted average for the first and the second total values, and for the first and the second durations; and
- setting a bit rate of the signal using the weighted average.

9. The method of claim 8, wherein the first duration is the shortest of the plurality of durations.

10. The method of claim 8, wherein determining one of the plurality of durations includes counting time intervals between detection of the first logical event and detection of the second logical event.

11. The method of claim 8, wherein the first logical event is detected by sensing a leading edge of a pulse corresponding to the signal.

12. The method of claim 8, wherein the second logical event is detected by sensing a leading edge of a pulse corresponding to the signal.

13. The method of claim 8, further comprising:
- determining whether the first total value is less than a threshold value; and
- if the first total value is less than the threshold value, then selecting another duration from among the plurality of durations, the another duration being the next shortest of the plurality of durations.

14. The method of claim 8, wherein determining the first total value includes:
- setting a counter to zero; and
- evaluating each duration of the plurality of durations to determine whether each duration is approximately equivalent to the selected first duration, and incrementing a counter for each duration that is approximately equivalent to the first duration.

15. The method of claim 8, wherein determining the weighted average includes:
- multiplying the selected first duration by the first total value to provide a first product;
- multiplying the second duration by the second total value to provide a second product;
- adding the first product and the second product to provide a sum of the products;
- adding the first total value and the second total value to provide a sum of the total values; and
- dividing the sum of the products by the sum of the total values to determine the weighted average.

16. The method of claim 8, wherein the bit rate is approximately equivalent to a mathematical inverse of one-half of the weighted average.

17. The method of claim 8, wherein the bit rate is a mathematical inverse of the weighted average.

18. The method of claim 8, wherein the plurality of durations are determined prior to counting those durations that are approximately equivalent to the selected first duration.

19. The method of claim 8, wherein counting those durations that are approximately equivalent to the selected first duration begins prior to counting a last of the plurality of durations.

20. The method of claim 8, wherein a mathematical inverse of the weighted average is used to set the bit rate of the signal.

21. An article of manufacture comprising a computer usable medium having computer readable program code instructions embodied therein for causing a computer to determine a bit rate of a signal, the instructions having:
- a computer readable program code module to determine durations, each duration corresponding to time elapsed between detection of a first logical event of the signal and detection of a second logical event of the signal;
- a computer readable program code module to select a first duration from among the plurality of durations;
- a computer readable program code module to count durations among the plurality of durations corresponding to the selected first duration to provide a first total value;
- a computer readable program code module to count those durations corresponding to a second duration to provide a second total value, the second duration corresponding to the selected first duration plus a time interval;
- a computer readable program code module to determine a weighted average for the first and the second total values, and for the first duration and the second duration; and
- a computer readable program code module to set a bit rate of the signal using a weighted average.

22. The article of manufacture of claim 21, wherein the first duration is the shortest of the plurality of durations.

23. The article of manufacture of claim 21, wherein the computer readable program code instructions for causing the computer to determine a plurality of durations include a computer readable program code module for counting time intervals occurring between detection of the first logical event and detection of the second logical event.

24. The article of manufacture of claim 21, wherein the instructions further include a computer readable program code module to cause a computer to determine whether the first total value is less than a threshold value, and if the first total value is less than the threshold value, the computer selects another duration from among the plurality of durations, the another duration being the next shortest of the plurality of durations.

25. The article of manufacture of claim 21, wherein the computer readable program code module to cause the computer to count durations and provide the first total value includes:
- a computer readable program code module to cause the computer to set a counter to zero;
- a computer readable program code module to cause the computer to evaluate each duration of the plurality of durations to determine whether each duration is approximately equivalent to the selected first duration; and
- a computer readable program code module to cause the computer to increment a counter for each duration that is approximately equivalent to the selected first duration.

26. The article of manufacture of claim 21, wherein the computer readable program code module to cause the computer to determine the weighted average includes:
- a computer readable program code module to cause the computer to multiply the selected first duration by the first total value to provide a first product;

a computer readable program code module to cause the computer to multiply the second duration by the second total value to provide a second product;

a computer readable program code module to cause the computer to add the first product and the second product to provide a sum of the products;

a computer readable program code module to cause the computer to add the first total value to the second total value to provide a sum of the total values; and a computer readable program code module to cause the computer to divide the sum of the products by the sum of the total values to determine the weighted average.

27. The article of manufacture of claim 21, wherein a mathematical inverse of the weighted average is used to set the bit rate of the signal.

28. A bit rate determining system, comprising a computer connected to a transmission line carrying a signal having logical events, the logical events including logical ones and logical zeros, the computer having software running thereon, the software being capable of instructing the computer to:

determine durations, each duration corresponding to time elapsed between detection of a first logical event of the signal and a second logical event of the signal;

select a first duration from the durations, and increment a first counter for each occurrence of the first duration to provide a first total value;

increment a second counter for each occurrence of a second duration to provide a second total value, the second duration corresponding to the selected first duration plus a time interval;

determine a bit rate of the signal using a weighted average corresponding to the first and the second total values.

29. The system of claim 28, wherein the computer has a system clock and the computer determines one of the durations by counting time intervals identified by the system clock.

30. The system of claim 28, wherein at least one of the logical events is detected by sensing a leading edge of a pulse corresponding to the signal.

* * * * *